April 15, 1958  C. B. SPEEGLE, SR  2,830,428
GRASS CATCHER FOR ROTARY TYPE LAWN MOWERS
Filed Jan. 3, 1956  3 Sheets-Sheet 1
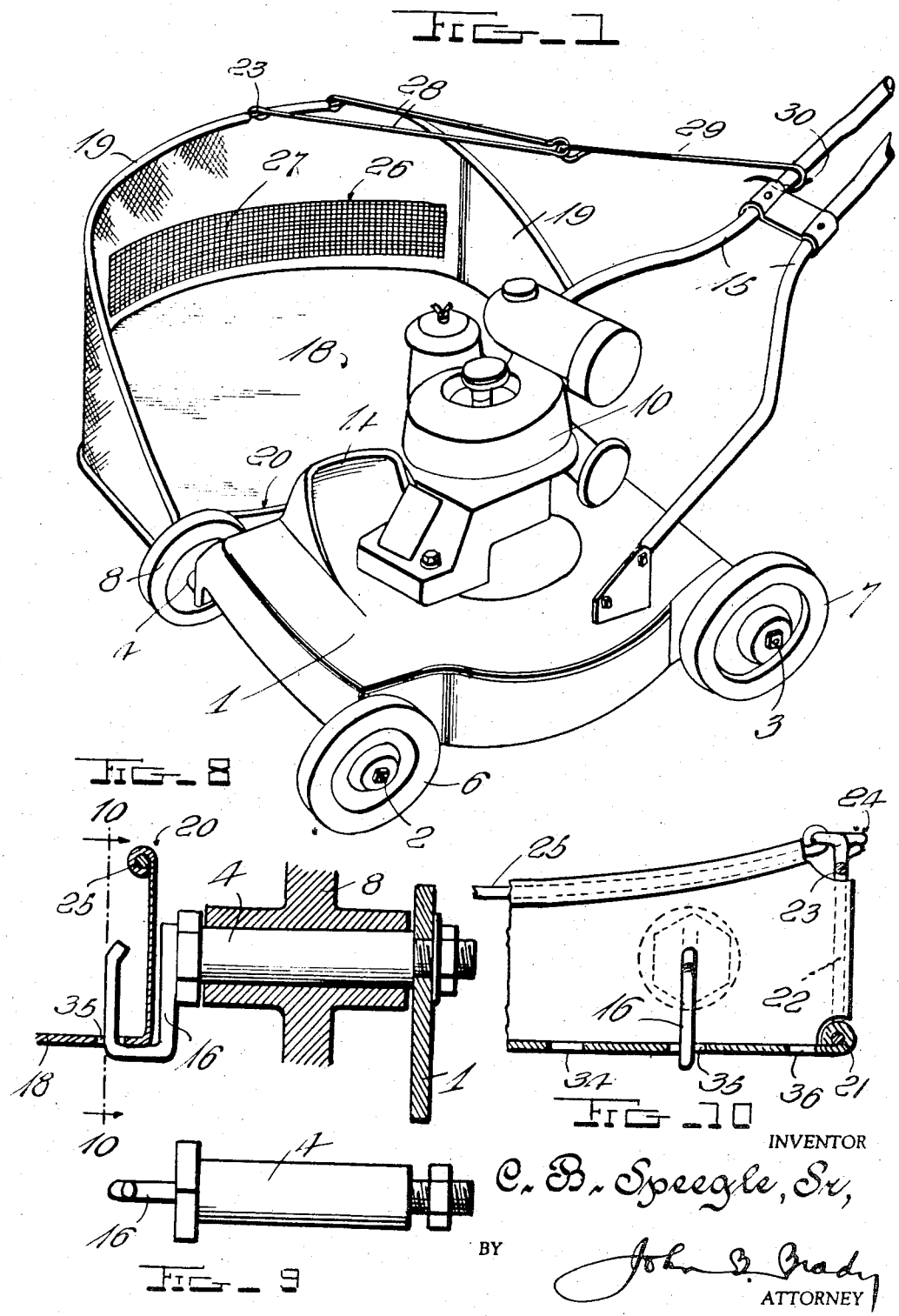

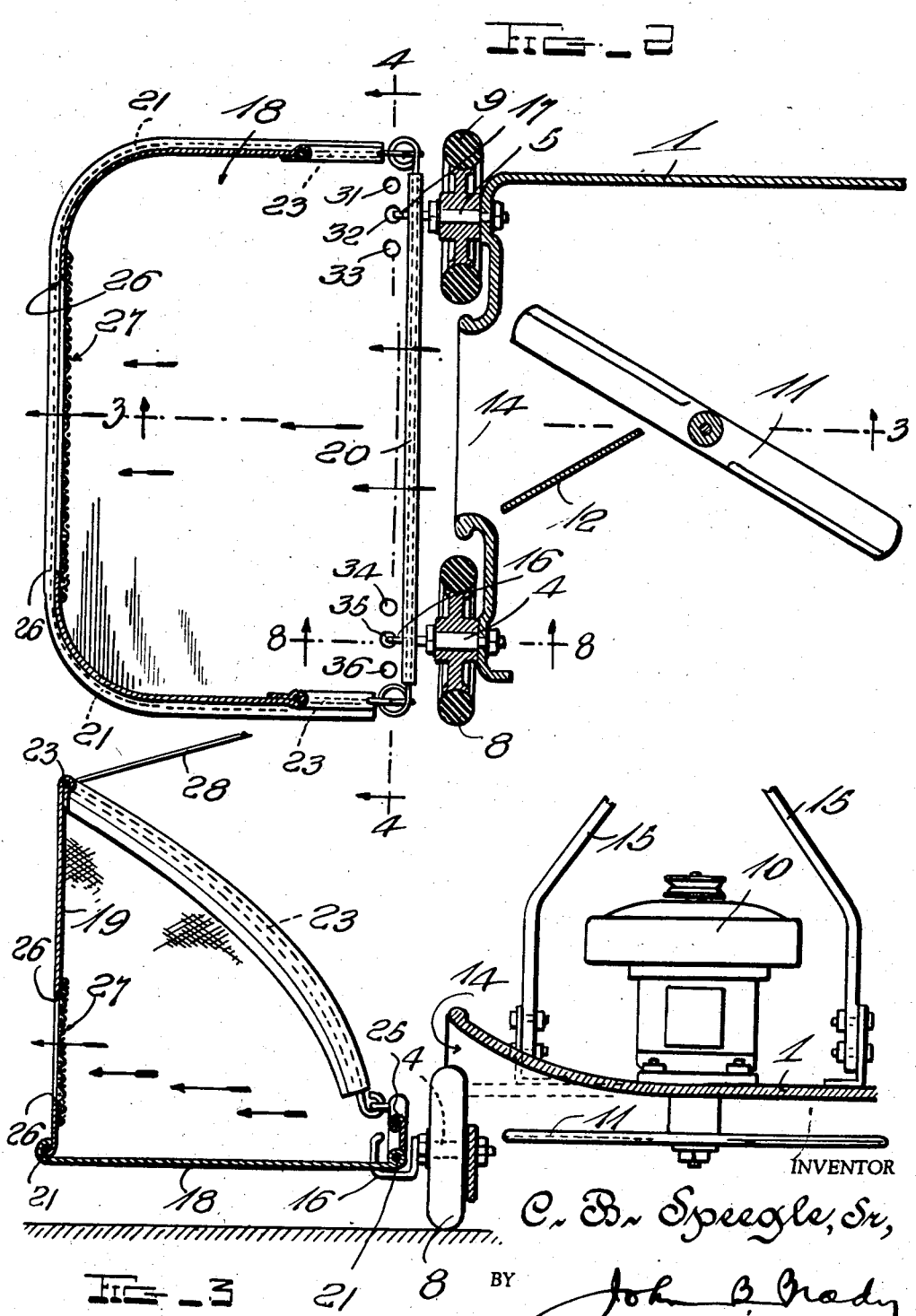

April 15, 1958  C. B. SPEEGLE, SR  2,830,428
GRASS CATCHER FOR ROTARY TYPE LAWN MOWERS
Filed Jan. 3, 1956  3 Sheets-Sheet 3
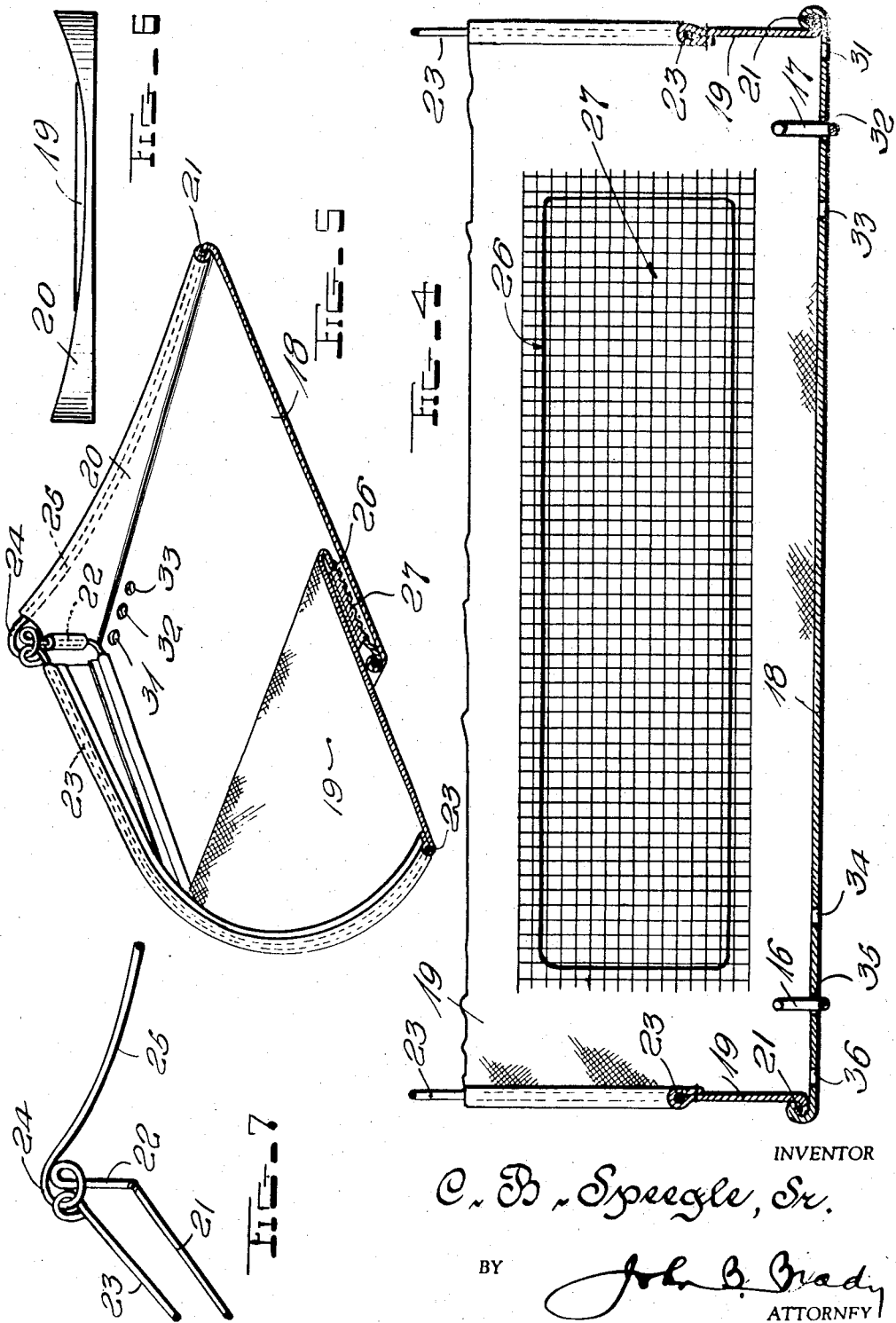
INVENTOR
C. B. Speegle, Sr.
BY John B. Brady
ATTORNEY

United States Patent Office 2,830,428
Patented Apr. 15, 1958

2,830,428

GRASS CATCHER FOR ROTARY TYPE LAWN MOWERS

C. B. Speegle, Sr., Oklahoma City, Okla.

Application January 3, 1956, Serial No. 557,142

3 Claims. (Cl. 56—202)

My invention relates broadly to lawn mowers and more particularly to a grass catcher for rotary type lawn mowers.

One of the objects of my invention is to provide a construction of grass catcher for rotary type lawn mowers including means for preventing the displacement of the grass cuttings which are collected in the grass catcher by reason of the velocity of the air which is developed by the operation of a rotary type lawn mower.

Another object of my invention is to provide a construction of grass catcher for rotary type lawn mowers which may be readily applied to various types and sizes of rotary type lawn mowers for the collection of grass cuttings with means for preventing the blowing of the grass cuttings out of the grass catcher due to the velocity of the air generated by the rotation of the rotary type lawn mower in its normal operation.

Still another object of my invention is to provide an arrangement of hook supports associated with the axles of the lawn mower by which a grass catcher may be readily supported in proper position adjacent the side of the frame of a rotary type lawn mower for catching the grass cuttings discharged from the lawn mower with means for dissipating the air pressure incidental to the functioning of the rotary type lawn mower and preventing the blowing of the grass cuttings out of the grass catcher in the course of the delivery of such grass cuttings to the grass catcher.

Still another object of my invention is to provide a construction of collapsible grass catcher for rotary type lawn mowers which may be readily packed and transported as a compact package including an open mesh screen in the rear wall of the grass catcher for preventing the building up of a pressure head in the grass catcher incidental to the discharge of grass cuttings therein from the rotary type cutting blade of a rotary type lawn mower.

Other and further objects of my invention reside in the construction of a form of grass catcher for rotary type lawn mowers which may be marketed inexpensively on a mass production scale with very substantial conveniences accruing to the user as set forth more fully in the specification hereinafter following by reference to the accompanying drawings in which:

Fig. 1 is a perspective view showing the grass catcher of my invention installed in position on a rotary type lawn mower and illustrating particularly the open mesh screen in the flexible rear wall of the grass catcher for preventing the building up of a pressure head due to the generated velocity of air which accompanies the discharge of the grass cuttings from one side of the frame of a rotary type lawn mower;

Fig. 2 is a fragmentary top plan view of the grass catcher and the connection means therefor to a rotary type lawn mower, the view being shown in partial horizontal section for the purpose of illustrating the co-action of the rotary type lawn mower with the pressure relieving grass catcher in accordance with my invention;

Fig. 3 is a transverse sectional view taken through the law mower substantially on line 3—3 of Fig. 2 and illustrating certain of the parts in elevation for more clearly showing the co-action of the rotary blade of the rotary type lawn mower with the grass catcher of my invention;

Fig. 4 is a fragmentary transverse vertical sectional view through the grass catcher taken substantially on line 4—4 of Fig. 2;

Fig. 5 is a perspective view taken through the longitudinal section of the grass catcher in collapsed position and showing particularly the open mesh screen in the flexible wall of the grass catcher;

Fig. 6 is a front view of the grass catcher folded to collapsed position for packaging and transportation;

Fig. 7 is a fragmentary perspective view showing the arrangement of the wire frame which supports the walls of the grass catcher of my invention;

Fig. 8 is an enlarged fragmentary transverse sectional view taken substantially on line 8—8 of Fig. 2;

Fig. 9 is a fragmentary top plan view of the axle and fastening hook of the assembly illustrated in Fig. 8; and Fig. 10 is a fragmentary vertical sectional view taken on line 10—10 of Fig. 8 and illustrating particularly the manner in which the grass catcher of my invention may be adapted to different makes and sizes of lawn mowers of the rotary type.

My invention is directed to a construction of grass catcher for lawn mowers of the rotary type. Heretofore, the gathering of the cuttings from a lawn mower of the rotary type has been impractical because of the unusual structure of a rotary type lawn mower where it has been exceedingly difficult to support a grass catcher with respect to such lawn mower. Furthermore, the collection of the grass cuttings from a rotary type lawn mower has been impractical because of the velocity of air which is generated incidental to the cutting operation due to the wind created by the rotary action of the cutting blade. The velocity of such wind is so great that the wind blows the grass cuttings out of the collecting basket as quickly as an attempt is made to discharge the cuttings therein. My invention provides a construction of grass catcher in which a flexible collapsible basket is provided with an open mesh screen in the rear wall thereof so arranged that when the basket is extended in operating the wind generated by the fan action of the rotary cutter is dissipated as rapidly as it is built up and the grass cuttings gravitated into the grass gatherer with the pressure head wholly relieved through the open mesh screen in the grass gatherer. I provide supporting hooks on the ends of the axles of the lawn mower into which selected pairs of spaced sets of apertures in the bottom of the grass catcher may be engaged. Thus the gatherer of my invention is adaptable to lawn mowers of different makes and sizes, thereby facilitating the marketing of the gatherer of my invention.

Referring to the drawings in more detail reference character 1 designates the frame of a rotary type lawn mower, the depending side walls of which support laterally projecting axles 2, 3, 4, and 5 providing journals for wheels 6, 7, 8, and 9. The frame 1 supports a driving engine unit 10 for rotatably driving the rotary blade 11 which co-acts with cutter bar 12 adjacent the discharge orifice 14 for directing the grass cuttings into the grass catcher shown at 18. The grass catcher is supported adjacent the side of the frame 1 adjacent the discharge orifice 14 on hooks 16 and 17 attached to the ends of axles 4 and 5.

The grass catcher 18 includes a frame and metal base which is provided with a wire frame 21 extending horizontally and connected with vertical wire frame members at opposite ends thereof shown at 22 and connected to a rearward extending wire frame member 23 which serves to support the flexible canvas wall 19. The flexible canvas wall 19 extends from the opposite edges of the metallic front end 20 which is curved downwardly to provide a shallow intake end for the gatherer permitting the grass cuttings to be blown into the receptacle formed by the gatherer. The downwardly curved front section 20 is supported across the front of the receptacle by wire frame member 25 which connects at opposite ends to loops 24 formed in the vertically extending wire frame members 22. The front section 20 is very rigid to reinforce the metallic bottom 18 of the gatherer so that the gatherer may be supported in a horizontal position at one side of the frame of the lawn mower.

The flexible wall 19 may be formed from canvas or other material and is provided with a central cut-out section 26 in the rear wall thereof slightly above the plane of the bottom 18 of the receptacle. The cut-out section 26 is covered by an open mesh screen 27. The screen 27 is of flexible construction and may be fabric or plastic or may be formed from flexible twisted paper fibers or other flexible tough material. A metallic screening of flexible material may be fastened in the cut-out opening 26. The rearwardly curved wire frame portion 23 is engaged by the ends of a V shaped wire section 28 to the apex of which there is attached a wire strand 29 which terminates in a hook 30 adapted to be engaged over one of the guide handles 15 of the lawn mower for supporting the gatherer in grass catching position at one side of the lawn mower. The wire strand 29 together with the V shaped section 28 serves to stretch the vertical wall 19 of the gatherer in a vertical position while the bottom 18 of the gatherer is horizontally supported by the hooks 16 and 17 extending from the axles 4 and 5 at one side of the lawn mower. I have found that various makes of rotary type lawn mowers have different spacing between the axles on which the wheels of the lawn mower are journalled and to provide for this I arrange sets of apertures in the metallic bottom 18 of the gatherer as represented at 31, 32, 33 and 34, 35, 36, in two groups adjacent opposite limits of the front edge 20 of the gatherer. By reason of the spacing of each of the groups of apertures the gatherer may be inserted over the upstanding ends 16 and 17 of the hooks of various types of rotary lawn mowers.

The pressure head due to the fan-like action of the rotary blade 11 of the rotary lawn mower in establishing a velocity flow through the discharge orifice 14 carries the grass cuttings into the receptacle of the grass catcher 18. The wind generated by the rotary blade 11 passes through the open mesh screen 27 in cut-out section 26 enabling the grass cuttings to gravitate into the basket of the gatherer where the grass cuttings are accumulated without scattering the grass cuttings which would otherwise be the case where the wind pressure is directed into a normally closed receptacle by the windmill action of the blade 11. The flexibility of the side walls 19 of the gatherer together with the flexibility of the screen 27 provide a combination which enables the gatherer to be collapsed in flat position as represented in Fig. 5 and is shown more clearly in end elevation as shown in Fig. 6, facilitating packing and transportation of the receptacle.

By reason of the fact that the receptacle of my invention is adapted to fit various makes and types of rotary lawn mowers because of the adjustability provided by the groups of apertures 31, 32, 33 and 34, 35, 36, a dealer may stock the same gatherer for a large number of different makes of rotary type lawn mowers.

I have found the construction of my invention highly practical and successful in its operation and while I have described my invention in one of its preferred embodiments I realize that modifications may be made and I desire that it be understood that no limitations upon my invention are intended other than may be imposed by the scope of the appended claims.

What I claim as new and desire to secure by Letters Patent of the United States is as follows:

1. A lawn mower of the rotary bar type including a frame, a pair of transversely disposed axles mounted in spaced parallel relation with respect to said frame, wheels carried by both of said axles for supporting said frame, the ends of said axles at one side of said frame each carrying upwardly extending hook members integral with said axles, a discharge exit for grass cuttings connected with said frame and terminating adjacent the hook members at the side of said frame, and a grass catcher for grass cuttings detachably engageable at one side thereof over said hook members adjacent the ends of said axles and aligned with said discharge exit for receiving and storing grass cuttings therein.

2. A lawn mower of the rotary bar type as set forth in claim 1 in which said grass catcher has a rigid bottom portion extending substantially coplanar with the bottom of said hook members and a flexible confining wall of flexible material extending upwardly from said bottom portion surrounding the discharge area of said discharge exit for retaining grass cuttings blown therein by the action of the rotary bar of the lawn mower and a flexible screen mounted in said confining wall directly opposite said discharge exit for relieving said grass catcher of the effect of any appreciable pressure head due to the velocity of the air discharged into said grass catcher and preventing the dislodgment of grass cuttings collected in said grass catcher.

3. A rotary lawn mower as set forth in claim 1, in which said grass catcher includes a flexible rear wall, a wire frame member for maintaining said wall in a stretched vertically erect position, a V-shaped wire element connected at spaced positions with the central portion of the upper extremity of said last mentioned wire frame member, the apex of said V-shaped wire element being connected through a wire link member with the supporting handle of the lawn mower for maintaining said grass catcher in a vertically erect position.

References Cited in the file of this patent

UNITED STATES PATENTS

| | | |
|---|---|---|
| 1,125,507 | Garstang | Jan. 19, 1915 |
| 1,153,303 | Hasseries | Sept. 14, 1915 |
| 1,669,471 | Jones | May 15, 1928 |
| 2,390,321 | Packwood | Dec. 4, 1945 |
| 2,641,100 | Sylvester | June 9, 1953 |
| 2,747,356 | Peterson | May 29, 1955 |